United States Patent
Tsuritani et al.

(10) Patent No.: US 8,254,782 B2
(45) Date of Patent: Aug. 28, 2012

(54) OPTICAL SIGNAL QUALITY MONITORING APPARATUS

(75) Inventors: Takehiro Tsuritani, Saitama (JP); Jun Haeng Lee, Saitama (JP); Tomohiro Otani, Saitama (JP)

(73) Assignee: KDDI Corporation, Tokyo (JP)

( * ) Notice: Subject to any disclaimer, the term of this patent is extended or adjusted under 35 U.S.C. 154(b) by 832 days.

(21) Appl. No.: 12/273,180

(22) Filed: Nov. 18, 2008

(65) Prior Publication Data

US 2009/0148158 A1 Jun. 11, 2009

(30) Foreign Application Priority Data

Dec. 10, 2007 (JP) .................... 2007-318364

(51) Int. Cl.
*H04B 10/08* (2006.01)
*H04B 10/12* (2006.01)
*G02B 26/00* (2006.01)

(52) U.S. Cl. .............................. 398/26; 398/15; 398/147

(58) Field of Classification Search .......... 359/237–238, 359/278–279, 315, 245, 247, 299, 310, 321, 359/248, 342, 344–345; 398/15, 33, 51, 398/94–95, 147, 182–183, 195–198, 204, 398/25–27

See application file for complete search history.

(56) References Cited

U.S. PATENT DOCUMENTS

| 6,055,278 | A  | * | 4/2000  | Ho et al. ................. 375/296 |
| 6,396,601 | B1 | * | 5/2002  | Takara et al. ................ 398/9 |
| 7,860,402 | B2 | * | 12/2010 | Tian et al. ................ 398/188 |
| 2003/0210912 | A1 | * | 11/2003 | Leuthold et al. ............ 398/188 |
| 2006/0285117 | A1 |   | 12/2006 | Shen |

FOREIGN PATENT DOCUMENTS

| JP | 2006-352892 A | 12/2006 |
| WO | WO 02/51041 A2 | 6/2002 |

OTHER PUBLICATIONS

Otani et al., "Demonstration of Far-end 160-Gb/s Waveform Measurement after 508-km Transmission in Field Trial without Traditional Clock Recovery," *ECOC 2006 Proceedings*, vol. 3, pp. 349-350.

* cited by examiner

*Primary Examiner* — Dawayne A Pinkney
(74) *Attorney, Agent, or Firm* — Oliff & Berridge, PLC

(57) ABSTRACT

The present invention relates to the quality monitoring of optical signals, which have different symbol rates and generated by different modulation schemes, used for example in a wavelength division multiplexing network. The apparatus according to the invention includes an optical splitter for outputting the input optical signal to a first optical route and a second optical route, an optical coupler for coupling a optical signal from the first optical route with a optical signal from the second optical route, a delay unit provided on the first optical route, and a phase shift unit provided on the first optical route or the second optical route.

7 Claims, 4 Drawing Sheets

OPTICAL SIGNAL QUALITY MONITORING APPARATUS

PRIORITY CLAIM

This application claims priority from Japanese patent application No. 2007-318364 filed on Dec. 10, 2007, which is incorporated herein by reference.

BACKGROUND OF THE INVENTION

1. Field of the Invention

The present invention relates to an apparatus, which monitors the quality of an optical signal.

2. Description of the Related Art

As optical modulation, phase shift keying (PSK) or differential PSK (DPSK) has attracted attention, because PSK and DPSK modulation has an advantage that it is less subject to the dispersion of the optical fiber. Further demodulation is easy in case of DPSK. Multilevel modulation is also available, and quadrature PSK (QPSK) and differential QPSK (DQPSK) have been proposed in international patent publication WO02/51041 A2.

Meanwhile, Akihito Otani et al., "Demonstration of Far-end 160-Gb/s Waveform Measurement after 508-km Transmission in Field Trial without Traditional Clock Recovery", ECOC 2006 Proceedings, Vol. 3, pp. 349-350 discloses a configuration which recovers a clock signal regardless of a symbol rate.

SUMMARY OF THE INVENTION

In a network system using a wavelength division multiplexing (WDM) technique, optical signals generated by various modulation schemes and having various bit rates or symbol rates are used simultaneously. Therefore, a quality monitoring apparatus needs to handle various optical signals.

Therefore, an object of the present invention is to provide an optical signal quality monitoring apparatus, which can handle a plurality of optical signals having different symbol rates and modulation formats.

According to the present invention, an optical signal quality monitoring apparatus has an optical splitter, an optical coupler, a delay unit and a phase shift unit.

The optical splitter divides an input optical signal to a first optical signal and a second optical signal, outputs the first optical signal to a first optical route, and outputs the second optical signal to a second optical route. The optical coupler couples the first optical signal with the second optical signal, and outputs a coupled optical signal to a measurement unit which measures the quality of the optical signal. The delay unit is provided on the first optical route, and the phase shift unit is provided on the first optical route or the second optical route.

Preferably, the delay unit introduces a delay into the optical signal passing through it such that the optical signal from the first optical route is delayed for the integral multiple of a symbol period of the input optical signal compared to the optical signal from the second optical route at the optical coupler. The phase shift unit introduces a phase shift into the optical signal passing through it, and the amount of phase shift is varied.

According to another aspect of the invention, an optical signal quality monitoring apparatus has a first optical splitter, a first optical coupler, a delay unit, a second optical splitter, a second optical coupler, a first phase shift unit and a second phase shift unit.

The first optical splitter divides an input optical signal to a first and a second optical signal, outputs the first optical signal to a first optical route, and outputs the second optical signal to a second optical route. The first optical coupler couples the first optical signal with the second optical signal, and outputs a coupled optical signal to a measurement unit, which measures the quality of the optical signal. The delay unit is provided on the first optical route. The second optical splitter is provided on the first optical route or the second optical route, and divides an input optical signal to a third optical signal and a fourth optical signal, outputs the third optical signal to a third optical route, and outputs the fourth optical signal to a fourth optical route. The second optical coupler couples the third optical signal with the fourth optical signal, and outputs a coupled optical signal. The first phase shift unit is provided on the third optical route, and the second phase shift unit is provided on the fourth optical route.

Due to the delay unit, the optical signal from the first optical route is delayed for the integral multiple of the symbol period of the input optical signal compared to the optical signal from the second optical route at the first optical coupler. Favorably, an amount of phase shift introduced by the first phase shift unit into the optical signal passing through it is varied, and a amount of phase shift introduced by the second phase shift unit into the optical signal passing through it is either the same or larger by π, i.e. reversed, compared to the amount of phase shift introduced by the first phase shift unit.

Advantageously, the second phase shift unit introduces the phase shift, which is in phase as the first phase shift unit does, in case the input optical signal is DPSK or DQPSK signal. On the contrary, the second phase shift unit introduces the phase shift, which is reversed phase as the first phase shift unit does, in case the input optical signal is amplitude shift keying (ASK) modulation signal.

Further objects and advantages of the present invention will be apparent from the following description of the preferred embodiments of the invention as illustrated in the accompanying drawings.

DETAILED DESCRIPTION OF THE INVENTION

Figure 1:
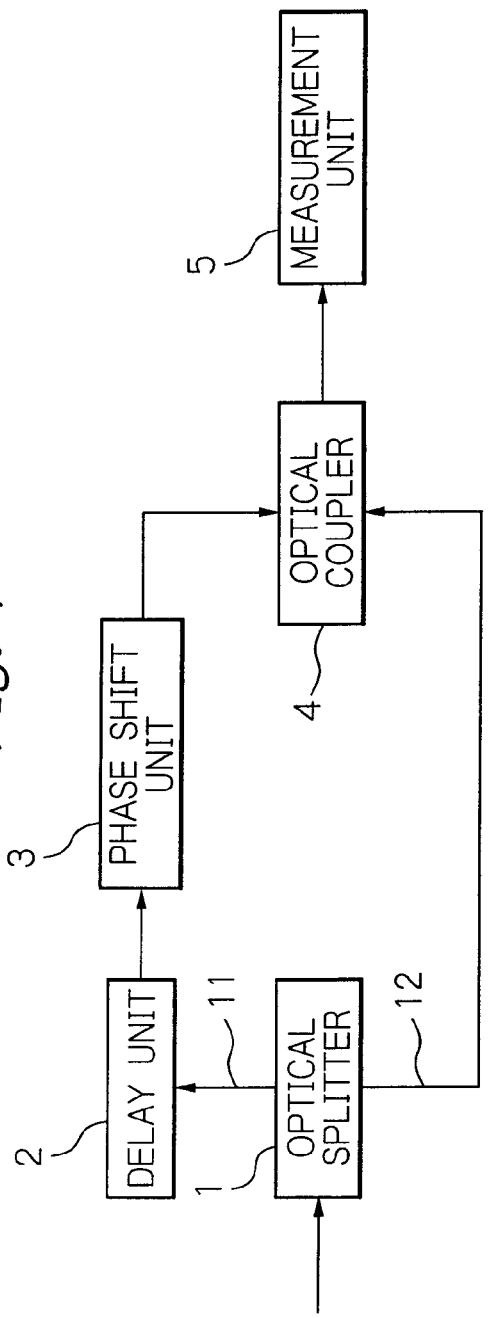
FIG. 1 is a block diagram of an optical signal quality monitoring apparatus according to the invention.

FIG. 1 is a block diagram of an optical signal quality monitoring apparatus according to the invention. The apparatus includes an optical splitter 1, a delay unit 2, a phase shift unit 3, an optical coupler 4 and a measurement unit 5.

The optical splitter 1 divides an input optical signal into a first optical signal and a second optical signal, outputs the first optical signal to an optical route 11, and outputs the second optical signal to an optical route 12. The optical coupler 4 couples the first optical signal passing through the optical route 11 with the second optical signal passing through the optical route 12, and the measurement unit 5 measures the quality of the input optical signal based on an optical signal from the optical coupler 4.

The delay unit 2 delays the first optical signal such that the first optical signal is delayed for the integral multiple of the symbol period of the input optical signal compared to the second optical signal at the coupler 4. In other word, the amount of delay of the first optical signal with reference to the second optical signal at the coupler 4 is n*(1/S), where n is an integer and S is a symbol rate of the input optical signal. The phase shift unit 3 shifts the phase of the first optical signal. In the embodiment, the delay unit 2 and the phase shift unit 3 are provided on the same optical route. However, the delay unit 2 and the phase shift unit 3 can be provided on different optical routes. Further, in the embodiment, the phase shift unit 3 is placed downstream of the delay unit 2. However, the phase shift unit 3 can be placed upstream of the delay unit 2.

For the normal demodulation process, the amount of delay at the coupler 4 is one symbol period. However, the purpose of the invention is not to demodulate the optical signal, but to determine the quality of the optical signal by monitoring the waveform. Thus, the amount of delay can be the integral multiple of the symbol period. Therefore, it is possible to monitor a plurality of optical signals having different symbol rates without changing the amount of delay introduced at the delay unit 2 by setting the amount of delay equal to the least common multiple of symbol rates of optical signals to be monitored to the delay unit 2.

Figure 2:
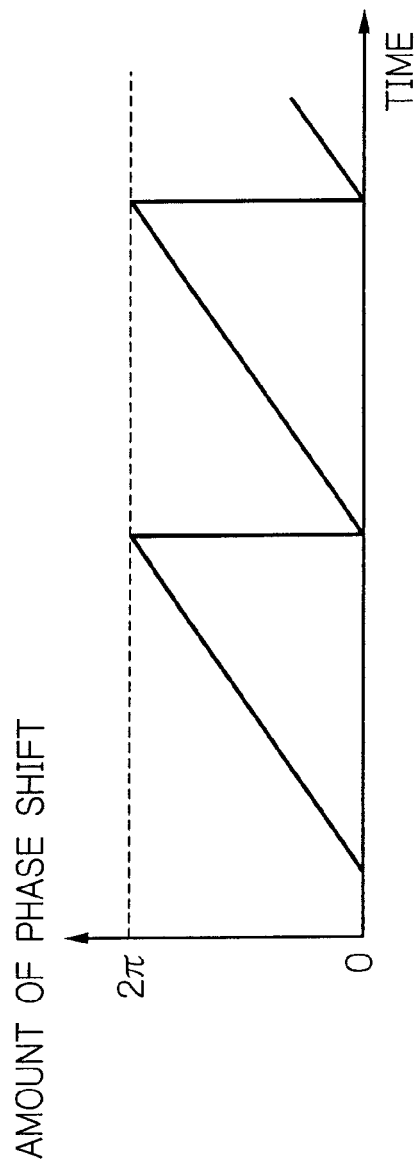
FIG. 2 shows periodically varying phase shift introduced by a phase shift unit.

FIG. 2 shows periodically varying phase shift added or introduced by the phase shift unit 3. The phase shift unit 3 is for example a heater, which changes refractive index of the optical fiber by adding a heat, and introduces a phase shift, the amount of which is periodically varied in the range of at least 0 to $\pi$, into the optical signal passing through it. In the embodiment shown in FIG. 2, the amount of phase shift is changed between 0 and $2\pi$ periodically. One period of the phase shift, i.e. the time from 0 shift to $2\pi$ shift in the embodiment, should be large enough compared to the symbol period of the input optical signal to be monitored. For example, for the optical signal having symbol rate more than 10 Gbaud, one period of the phase shift is set to more than 1 second. In the embodiment, the change of phase shift is ramp-shaped. However, the invention is not limited to this, and it is possible to use other shape like sinusoidal-shaped or triangle-shaped. Further, nonperiodic phase variation can be used.

Figure 3:
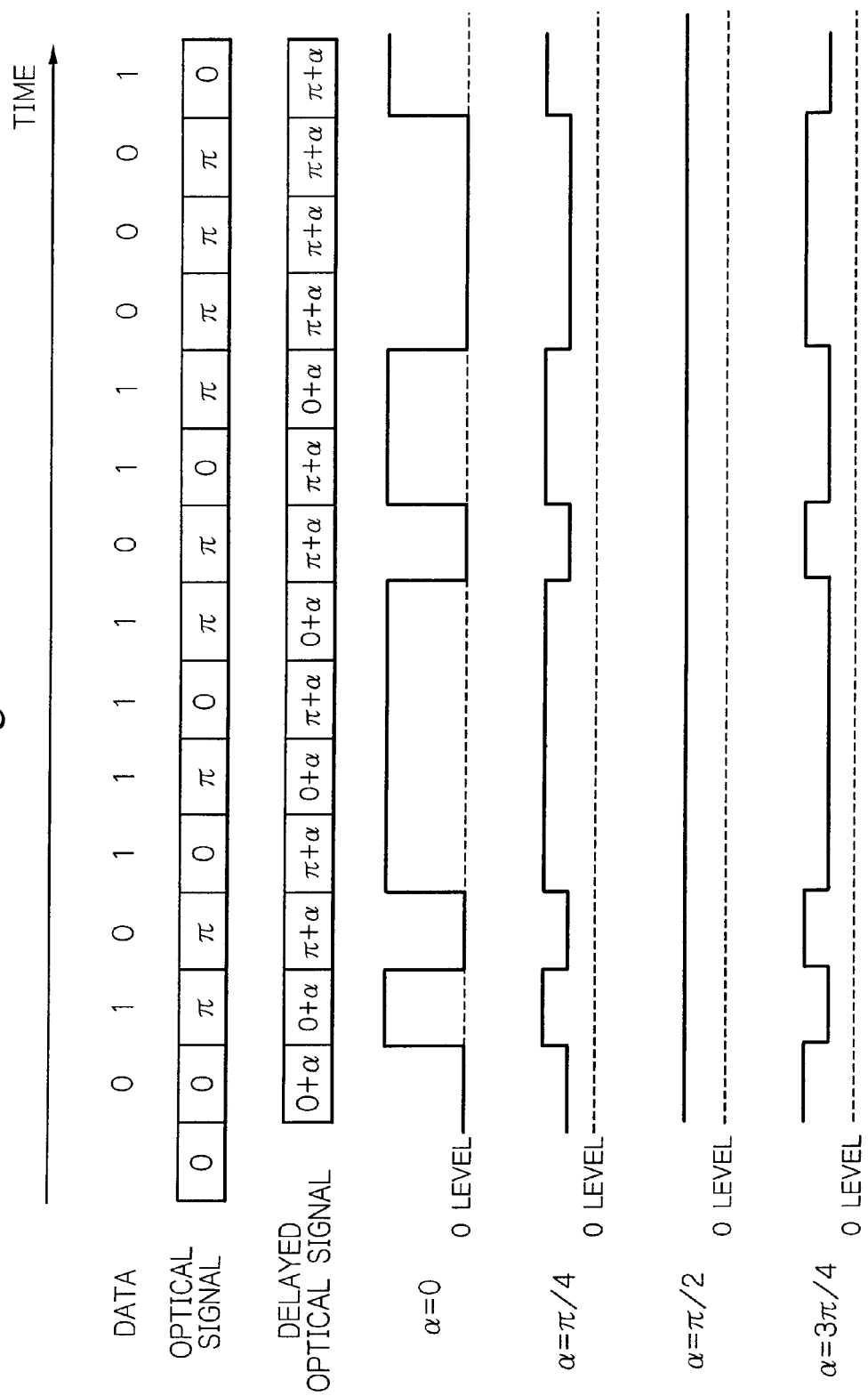
FIG. 3 is an explanation drawing of the quality monitoring for an optical DPSK modulation signal according to the invention.

FIG. 3 is an explanation drawing of the quality monitoring for an optical DPSK modulation signal according to the invention. In FIG. 3, the optical signal shows optical phases of the optical DPSK signal corresponding to data sequence indicated at the first line. At the optical coupler 4, the optical signal is coupled with another optical signal, which is delayed for several bits at the delay unit 2. However, the amount of delay introduced by the delay unit 2 is not accurate, and there is some phase error at the optical coupler 4. In FIG. 3, the delayed optical signal shows the optical phases of a 1 bit delayed optical DPSK signal at the optical coupler 4, and it has the offset by a due to above-described reason.

In a normal demodulator, the phase offset or error is compensated using a complex and expensive feedback loop. However, the apparatus according to the invention uses the phase shift unit 3, which shifts optical phase as shown in FIG. 2, instead of the complex feedback loop. Because of the phase shift introduced by the phase shift unit 3, the phase offset a at the optical coupler 4 varies 0 to $2\pi$. FIG. 3 also shows waveforms output from the optical coupler 4, in case the offset $\alpha$ equal to 0, $\pi/4$, $\pi/2$ and $3\pi/4$, respectively. In case the offset $\alpha$ equals to 0, the optical coupler 4 outputs an optical ASK signal, which is used in the normal demodulation process. With increasing the offset $\alpha$ from 0, the maximum amplitude of the ASK signal decreases, and the minimum amplitude of the ASK signal increases, as shown in case of $\alpha=\pi/4$. When the offset $\alpha$ becomes $\pi/2$, the maximum amplitude is the same as the minimum amplitude as shown in FIG. 3. With increasing the offset $\alpha$ from $\pi/2$, the optical coupler 4 outputs the ASK signal, the maximum and the minimum amplitude of which are inverted compared to the signal while the offset $\alpha$ is in the range of 0 to $\pi/2$, as shown in case of $\alpha=3\pi/4$.

The measurement unit 5 receives the optical signal output from the optical coupler 4, and determines the maximum eye opening points of the signal. Here, the maximum eye opening points means signal points that the difference between the maximum amplitude and the minimum amplitude becomes the maximum. More specifically, the maximum eye opening points are instants when the offset $\alpha$ is 0 or $\pi$ according to the embodiment. The measurement unit 5 uses each predetermined period of the signal from the coupler 4 including the determined maximum eye opening point for measuring Q factor of the input optical signal. More specifically, the measurement unit 5 extracts a clock signal and a trigger from the optically sampled optical signal, for example, using the method described in Akihito Otani et al., "Demonstration for Far-end 160-Gb/s Waveform Measurement after 508-km Transmission in Field Trial without Traditional Clock Recovery". Further, the measurement unit 5 converts the optical signal to an electrical signal, and samples the electrical signal. Then, the measurement unit 5 determines maximum eye opening points of the sampled electrical signal, determines parts of the sampled electrical signal used for Q factor measurement based on the maximum eye opening points, and measures Q factor from a distribution of the maximum amplitude and minimum amplitude in the determined parts of the signal. For example, the period of the signal for Q factor measurement is decided by the phase shift period of the phase shift unit 3. Further, the period of the signal for Q factor measurement can be decided based on the ratio of eye opening to the maximum eye opening. In other word, Q factor measurement is performed while difference between the maximum and the minimum amplitude is more than the value, which is decided based on the maximum eye opening.

Figure 4A:
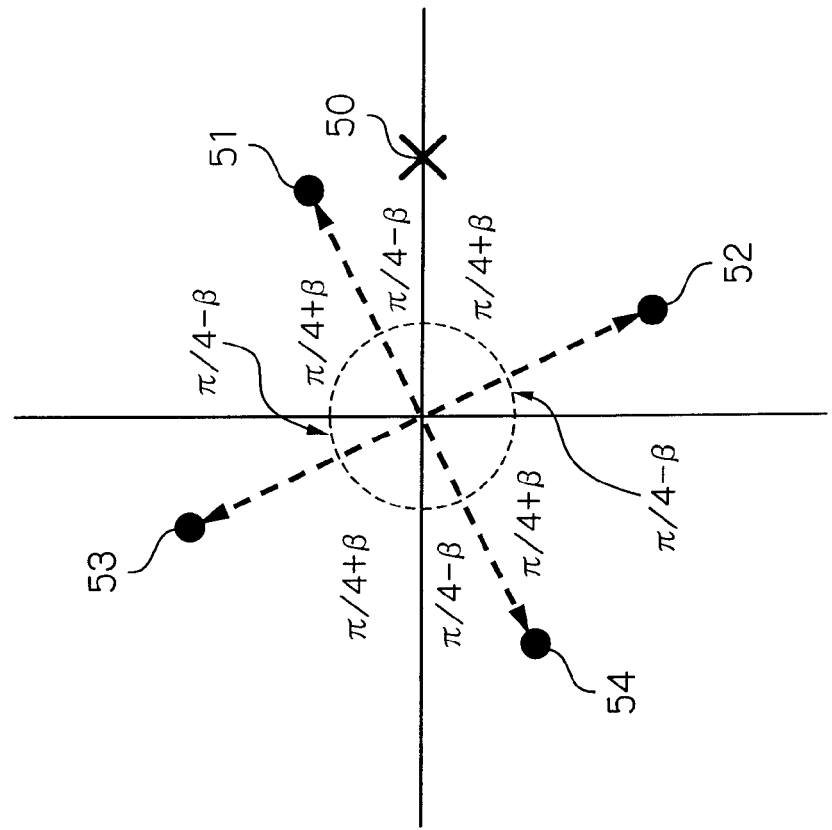
FIGS. 4a and 4b are explanation drawings of the quality monitoring for an optical DQPSK modulation signal according to the invention.
Figure 4B:
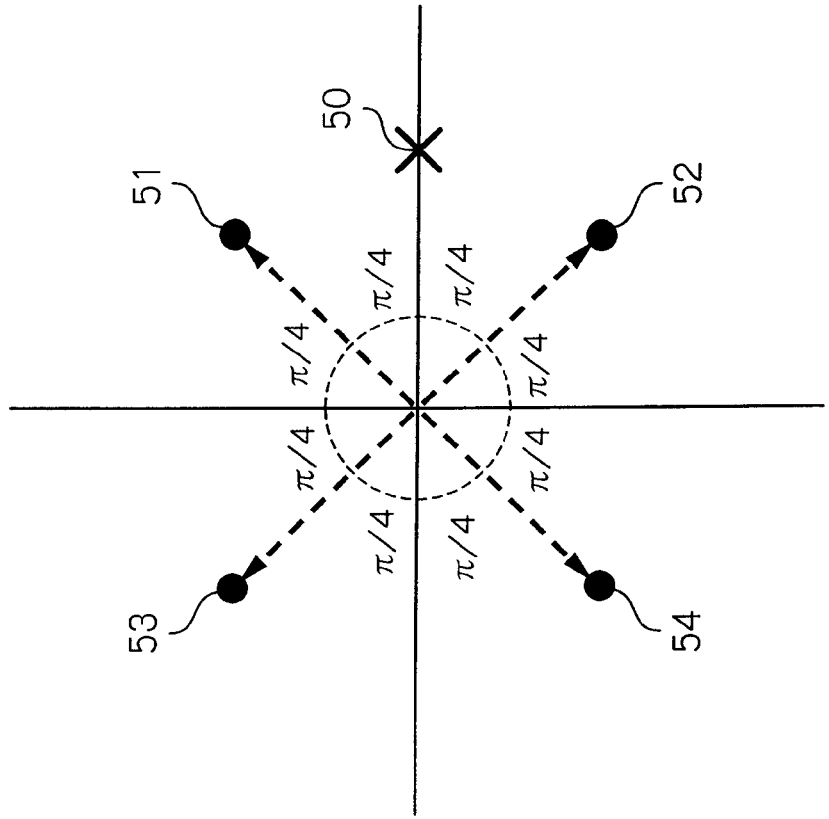

FIGS. 4a and 4b are explanation drawings of the quality monitoring for an optical DQPSK modulation signal according to the invention. In the demodulation process of the optical DQPSK signal, the optical DQPSK signal is divided to a first DQPSK signal and a second DQPSK signal. Then, the first DQPSK signal is delayed for 1 bit, and phase-shifted by $+\pi/4$ or $-\pi/4$. Finally, the second DQPSK signal is coupled with the delayed and phase-shifted first DQPSK signal at a coupler to output an optical ASK signal.

For example, in case the optical DQPSK signal uses optical phases of 0, $\pi/2$, $\pi$ and $3\pi/2$, optical phases of the first DQPSK signal is $\pi/4$, $3\pi/4$, $5\pi/4$ and $7\pi/4$ at the coupler as indicated by coordinates 51, 53, 54 and 52 in FIG. 4a, respectively. The coupler combines the first DQPSK signal having an optical phase of $\pi/4$, $3\pi/4$, $5\pi/4$ or $7\pi/4$ with the second DQPSK signal having an optical phase of 0, $\pi/2$, $\pi$ or $3\pi/2$. In FIG. 4a, only an optical phase 0 is indicated by a reference numeral 50 for the second DQPSK signal. As apparent from FIG. 4a, amplitude of the coupled signal output from the coupler has 2 levels. In case the optical phase of the second DQPSK signal is 0 as shown in FIG. 4a, the maximum level is output when an optical phase of the first DQPSK signal is $\pi/4$ or $7\pi/4$, and the minimum level is output when an optical phase of the first DQPSK signal is $3\pi/4$ or $5\pi/4$. However, as already explained, there is some phase offset at the coupler. FIG. 4b shows optical phases of the first DQPSK signal at the coupler, in case there is a phase error or offset β. In this case, as apparent from FIG. 4b, the coupler outputs a signal, amplitude of which has 4 levels. That is the eye opening become smaller.

In the apparatus, an input optical DQPSK signal is divided into a first DQPSK signal and a second DQPSK signal at the optical splitter 1. The first DQPSK signal passes through the optical route 11, and the second DQPSK signal passes through the optical route 12. One or more bits delay and the phase shift shown in FIG. 2 are introduced into the first DQPSK signal by the delay unit 2 and the phase shift unit 3. Thus, the optical coupler 4 outputs the ASK signal when the phase offset β is 0, π/2, π or 3π/2, and outputs the signal having 4 levels in other cases. The measurement unit 5 receives the optical signal output from the optical coupler 4, determines the maximum eye opening points of the signal, determines parts of the signal used for Q factor measurement based on the maximum eye opening points, and measures Q factor from a distribution of the maximum amplitude and minimum amplitude in the determined parts of the signal. In case of the DQPSK signal, the maximum eye opening points are obtained when the signal becomes 2 levels.

As described above, the apparatus according to the invention can monitor both optical DPSK and DQPSK signals. Since the complex feedback loop is not required for the apparatus, it is possible to reduce the cost of the apparatus. Further, the apparatus can monitor a plurality of optical signals having different symbol rates by setting the integral multiple of the symbol period for the amount of delay to the delay unit 2.

Figure 5:
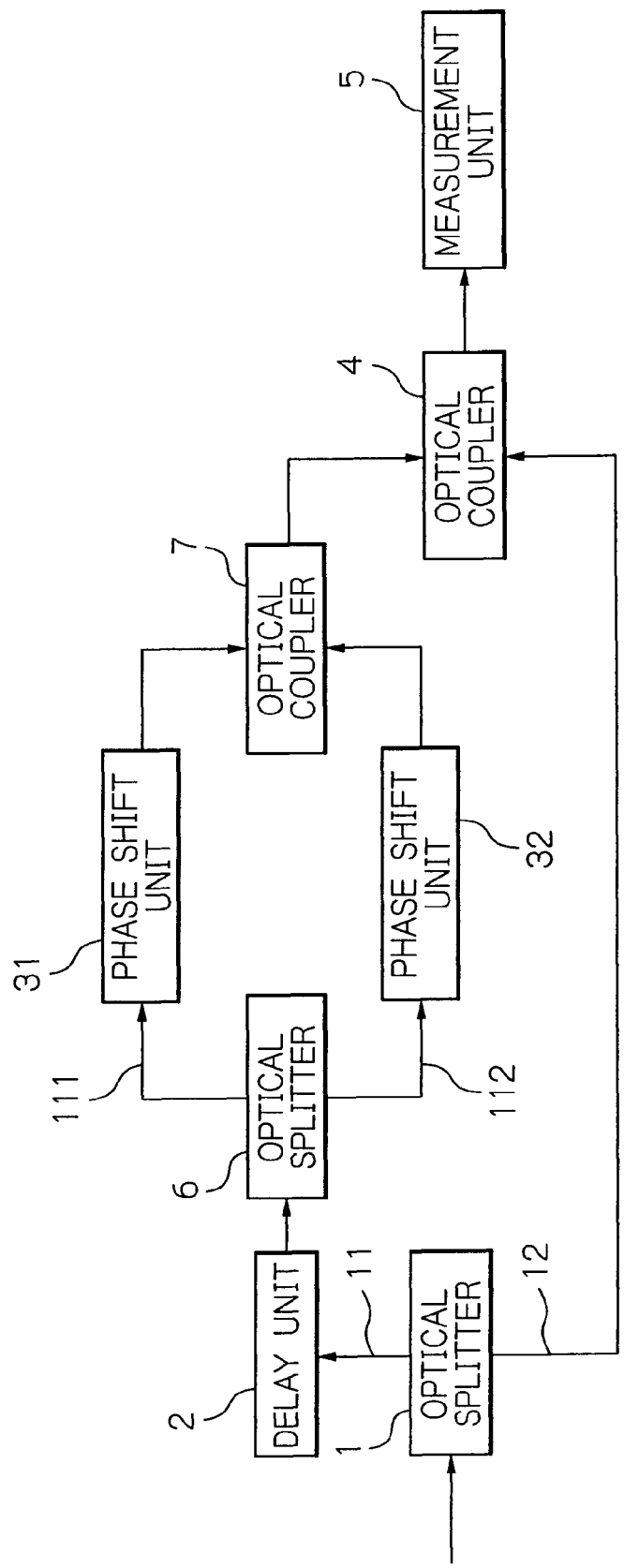
FIG. 5 is a block diagram of an optical signal quality monitoring apparatus according to another embodiment of the invention.

FIG. 5 is a block diagram of an optical signal quality monitoring apparatus according to another embodiment of the invention. The apparatus according to the embodiment can monitor an optical ASK signal in addition to the optical DPSK and DPQSK signals. In FIGS. 1 and 5, the same reference numeral is used for the element having the same or similar function, and hereinafter the explanation is omitted for the element having the same reference numeral in FIG. 1. In the embodiment, an optical splitter 6 further divides the first optical signal to a third and a fourth optical signal, outputs the third optical signal to an optical route 111, and outputs the fourth optical signal to an optical route 112. A phase shifts unit 31 shifts the optical phase of the third optical signal, and a phase shift unit 32 shifts the optical phase of the fourth optical signal. An optical coupler 7 couples the third optical signal with the fourth optical signal, and outputs the coupled signal to the optical coupler 4 via the optical route 11.

In the embodiment, the phase shift unit 31 shifts the phase of the optical signal passing through it. The amount of phase shift introduced by the phase shift unit 31 is varied at least in the range of 0 to π. In the embodiment shown in FIG. 2, the amount of phase shift is changed between 0 and π. The phase shift unit 32 also introduces the phase shift into the optical signal passing through it. The phase shift unit 32 is adapted to introduce the same phase shift or reverse phase shift with reference to the phase shift introduced by the phase shift unit 31.

More specifically, in case of monitoring the optical DPSK or DQPSK signal, the amount of phase shift introduced by phase shift units 31 and 32 are the same. On the contrary, in case of monitoring the optical ASK signal, the amount of phase shift introduced by the phase shift units 32 is reversed compared to the amount of phase shift introduce by the phase shift unit 31. In other words, when the phase shift unit 31 shifts the phase by θ, the phase shift unit 32 shifts the phase by θ+π.

In case the phase shift units 31 and 32 introduce the same phase shift, the optical coupler 7 outputs the same signal, but phase shifted, as the input to the optical splitter 6. Therefore, an arrangement having the optical splitter 6, the phase shift unit 31, the phase shift unit 32 and the optical coupler 7 is equivalent to the phase shift unit 3 in FIG. 1, and works as the same way as already explained using FIG. 1. In case the phase shift units 31 and 32 introduce reverse phase shift, the optical coupler 7 does not output a signal. Therefore, the optical coupler 4 just outputs the optical signal from the optical route 12, i.e. the input optical ASK signal. Therefore, in either case, the optical coupler 4 outputs the optical ASK signal to the measurement unit 5.

In the embodiment, the amount of phase shift introduced by the phase shift unit 32 is switchable between in phase and reverse phase with reference to the one introduced by the phase shift unit 31, and control unit, not shown in figures, selects in phase or reverse phase based on the modulation format applied to the input optical signal. With this configuration, it is possible to monitor the optical ASK signal in addition to the optical DPSK and DQPSK signals.

In FIG. 5, the arrangement having the optical splitter 6, the phase shift unit 31, the phase shift unit 32 and the optical coupler 7 is provided on the optical route 11. However the arrangement can be provided on the optical route 12. Further the arrangement can be provided upstream of the delay unit 2.

Many modifications and variations will be apparent those of ordinary skilled in the art. The embodiments was chosen and described in order to best explain the principles of the invention. It should be understood that the present invention is not limited to the specific embodiments described in the specification, except as defined in the appended claims.

For example, the phase shift range in the embodiment described above is at least 0 to π. However, it is possible to use π to 2π. In other words, it is possible to apply any range if the difference between the maximum phase shift and the minimum phase shift introduced by the phase shift unit is more than or equal to π. Further, in case only optical DQPSK and ASK signals are monitored, the phase shift range in the phase shift unit can be, for example, 0 to π/2. In this way, the required phase shift range depends on modulation formats to be monitored, and the person in the art can select the range based on signals to be monitored.

The invention claimed is:

1. An optical signal quality monitoring apparatus comprising:
    an optical splitter for dividing an input optical signal and outputting to a first optical route and a second optical route;
    an optical coupler for coupling a optical signal from the first optical route with a optical signal from the second optical route;
    a delay unit provided on the first optical route; and
    a phase shift unit provided on the first optical route or the second optical route,
    wherein the phase shift unit introduces a periodic dynamic phase shift as a function of time into the optical signal passing through the optical signal quality monitoring apparatus.

2. The optical signal quality monitoring apparatus according to claim 1, wherein
    the delay unit introduces a delay into the optical signal passing through it such that the optical signal from the first optical route is delayed for an integral multiple of a symbol period of the input optical signal compared to the optical signal from the second optical route at the optical coupler, and the phase shift unit introduces a varying phase shift into the optical signal passing through it.

3. The optical signal quality monitoring apparatus according to claim 2, wherein
the difference between the minimum phase shift and the maximum phase shift introduced by the phase shift unit is more than or equal to $\pi$.

4. The optical signal quality monitoring apparatus according to claim 1, further comprising a measurement unit for receiving an optical signal output from the optical coupler,
wherein the measurement unit uses signal parts including the maximum eye opening point of the received signal for determining the quality of the input optical signal.

5. An optical signal quality monitoring apparatus comprising:
a first optical splitter for dividing an input optical signal and outputting to a first optical route and a second optical route;
a first optical coupler for coupling a optical signal from the first optical route with a optical signal from the second optical route;
a delay unit provided on the first optical route; and
an arrangement provided on the first optical route or the second optical route,
wherein the arrangement comprises:
a second optical splitter for dividing an optical signal input to it and outputting to a third optical route and a fourth optical route;
a second optical coupler for coupling a optical signal from the third optical route with a optical signal from the fourth optical route;
a first phase shift unit provided on the third optical route; and
a second phase shift unit provided on the fourth optical route,
wherein the first phase shift unit introduces a periodic dynamic phase shift as a function of time into the optical signal passing through the optical signal quality monitoring apparatus, and the second phase shift unit introduces a periodic dynamic phase shift as a function of time into the optical signal passing through the optical signal quality monitoring apparatus.

6. The optical signal quality monitoring apparatus according to claim 5, wherein
the delay unit introduces a delay into the optical signal passing through it such that the optical signal from the first optical route is delayed for an integral multiple of a symbol period of the input optical signal compared to the optical signal from the second optical route at the first optical coupler,
the first phase shift unit introduces a varying phase shift into the optical signal passing through it, and
the second phase shift unit introduces a phase shift into the optical signal passing through it,
wherein the phase shift introduced by the second phase shift unit is in phase or reverse phase with reference to one introduced by the first phase shift unit.

7. The optical signal quality monitoring apparatus according to claim 6, wherein the phase shift introduced by the second phase shift unit is in phase when the input optical signal is a differential phase shift keying or a differential quadrature phase shift keying modulation signal, and the phase shift introduced by the second phase shift unit is reverse phase when the input optical signal is an amplitude shift keying modulation signal.

* * * * *